(12) United States Patent
Lee et al.

(10) Patent No.: US 11,598,487 B2
(45) Date of Patent: Mar. 7, 2023

(54) SEALING APPARATUS FOR HIGH-PRESSURE TANK AND HIGH-PRESSURE TANK COMPRISING SAME

(71) Applicant: LOTTE CHEMICAL CORPORATION, Seoul (KR)

(72) Inventors: You Jung Lee, Daejeon (KR); Young Koan Ko, Daejeon (KR); Dae Gun Kim, Daejeon (KR); Won Young Kim, Daejeon (KR); Tae Wook Kim, Busan (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 17/298,391

(22) PCT Filed: Nov. 28, 2019

(86) PCT No.: PCT/KR2019/016638
§ 371 (c)(1),
(2) Date: May 28, 2021

(87) PCT Pub. No.: WO2020/111842
PCT Pub. Date: Jun. 4, 2020

(65) Prior Publication Data
US 2021/0396357 A1 Dec. 23, 2021

(30) Foreign Application Priority Data
Nov. 30, 2018 (KR) .................. 10-2018-0153001

(51) Int. Cl.
*F17C 13/00* (2006.01)
*F17C 1/06* (2006.01)
*F17C 1/16* (2006.01)

(52) U.S. Cl.
CPC .............. *F17C 13/002* (2013.01); *F17C 1/06* (2013.01); *F17C 1/16* (2013.01);
(Continued)

(58) Field of Classification Search
CPC .. F17C 13/002; F17C 1/06; F17C 1/16; F17C 2201/0109; F17C 2203/011;
(Continued)

(56) References Cited

U.S. PATENT DOCUMENTS

| 8,231,028 B2 * | 7/2012 | Matsuoka ................ F16J 13/12 220/582 |
| 8,640,910 B2 * | 2/2014 | Novak ...................... F17C 1/16 220/582 |

(Continued)

FOREIGN PATENT DOCUMENTS

| CN | 106439488 A | 2/2017 |
| CN | 108131556 A | 6/2018 |

(Continued)

OTHER PUBLICATIONS

International Search Report issued in International Application No. PCT/KR2019/016638 dated Mar. 19, 2020 (2 pages).

(Continued)

*Primary Examiner* — John K Fristoe, Jr.
*Assistant Examiner* — Laura E. Parker
(74) *Attorney, Agent, or Firm* — Osha Bergman Watanabe & Burton LLP

(57) ABSTRACT

The present invention relates to a sealing apparatus for a high-pressure tank and a high-pressure tank comprising same, wherein the sealing apparatus comprises: a liner configured to accommodate a high-pressure fluid; a connection boss which is a metallic connector provided at an inlet of the liner and includes a first connection boss part coupled to an inner surface of the inlet and a second connection boss (Continued)

part coupled to an outer surface of the inlet and having a tapered shape with a relatively narrow upper side and a relatively wide lower side; and a coupling member configured to come into surface contact with an outer surface of the second connection boss part and having a tilted surface corresponding to a shape of the second connection boss part so that an inner diameter of a lower side is larger than that of an upper side.

6 Claims, 3 Drawing Sheets

(52) U.S. Cl.
CPC . *F17C 2201/0109* (2013.01); *F17C 2203/011* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2221/012* (2013.01); *F17C 2221/033* (2013.01); *F17C 2270/0168* (2013.01)

(58) Field of Classification Search
CPC ...... F17C 2203/0604; F17C 2203/0619; F17C 2203/066; F17C 2203/0663; F17C 2205/0305; F17C 2221/012; F17C 2221/033; F17C 2270/0168; F17C 13/08; F17C 2205/00; F17C 2205/01; F17C 2205/0153
USPC .................................................. 220/581, 586
See application file for complete search history.

(56) References Cited

U.S. PATENT DOCUMENTS

| | | |
|---|---|---|
| 2010/0163565 A1 | 7/2010 | Matsuoka et al. |
| 2011/0220661 A1* | 9/2011 | Strack ................... F17C 13/002 |
| | | 220/601 |
| 2013/0152371 A1 | 6/2013 | Strack |
| 2016/0025266 A1* | 1/2016 | Leavitt ..................... F17C 1/06 |
| | | 206/0.6 |

FOREIGN PATENT DOCUMENTS

| | | | |
|---|---|---|---|
| DE | 29917471 U1 | | 12/1999 |
| EP | 0398827 B1 | | 3/1994 |
| JP | H10332084 A | * | 12/1998 |
| JP | 2002537530 A | | 11/2002 |
| JP | 2003287193 A | | 10/2003 |
| JP | 2007263290 A | | 10/2007 |
| JP | 2008101677 A | * | 5/2008 |
| JP | 2008101677 A | | 5/2008 |
| JP | 2009058111 A | | 3/2009 |
| JP | 2011102614 A | | 5/2011 |
| JP | 2017525902 A | | 9/2017 |

OTHER PUBLICATIONS

Written Opinion issued in International Application No. PCT/KR2019/016638 dated Mar. 19, 2020 (4 pages).
Office Action issued in corresponding CN Application No. 2019980075853.2 with English translation dated Mar. 16, 2022 (12 pages).
Office Action issued in corresponding JP Application No. 2021-529362 with English translation dated Apr. 15, 2022 (8 pages).
Extended European Search Report issued in corresponding EP Application No. 19889192.1 dated Jul. 27, 2022 (6 pages).

* cited by examiner

[Fig. 1]
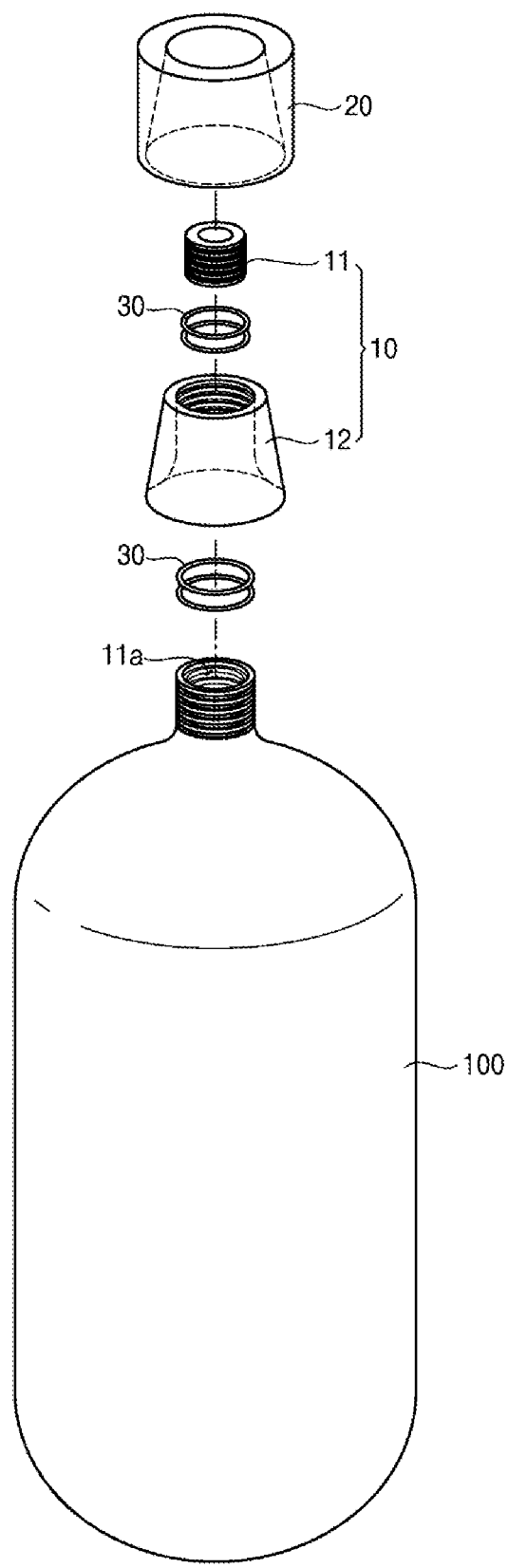

[Fig. 2]
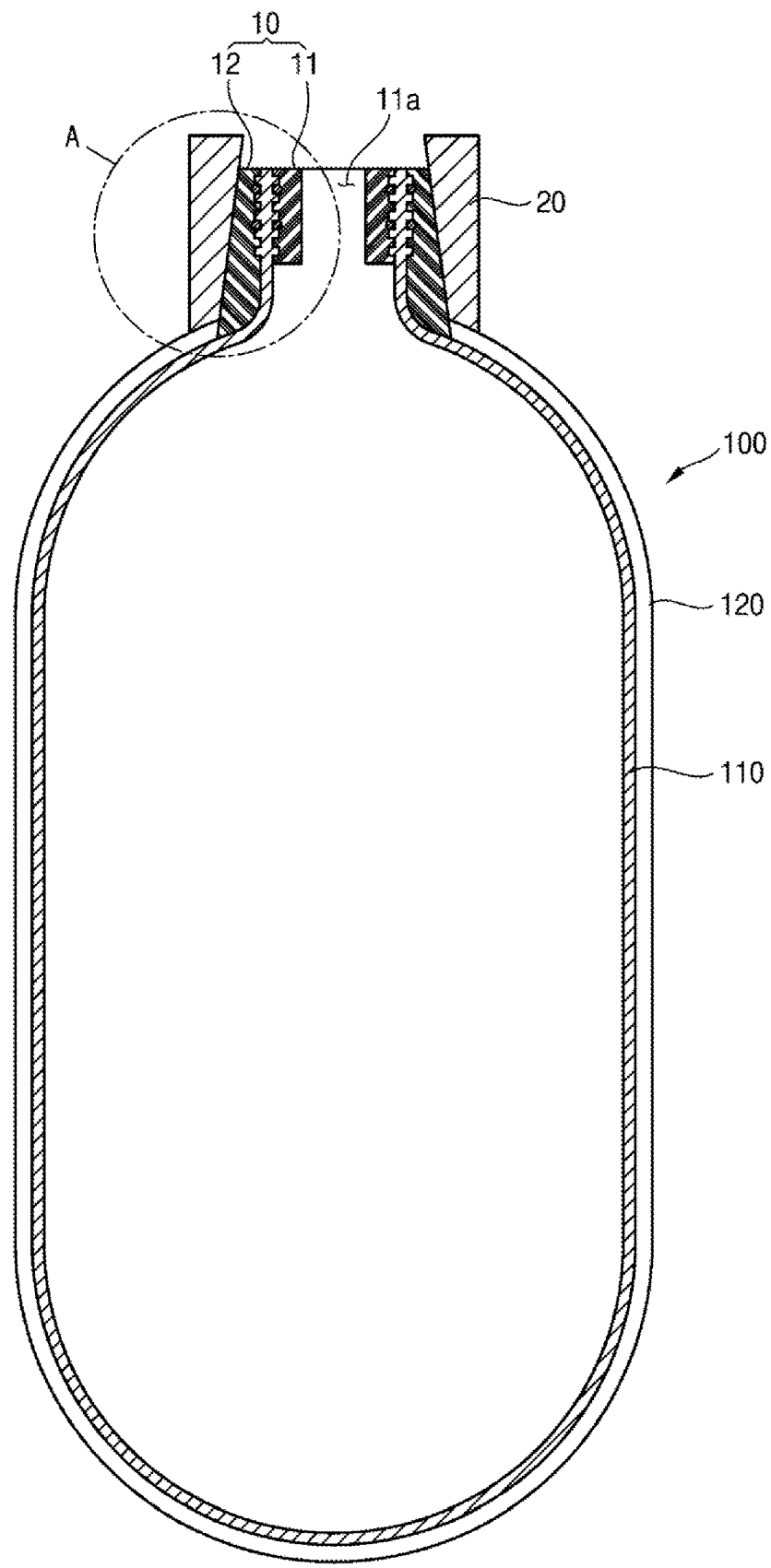

[Fig. 3]
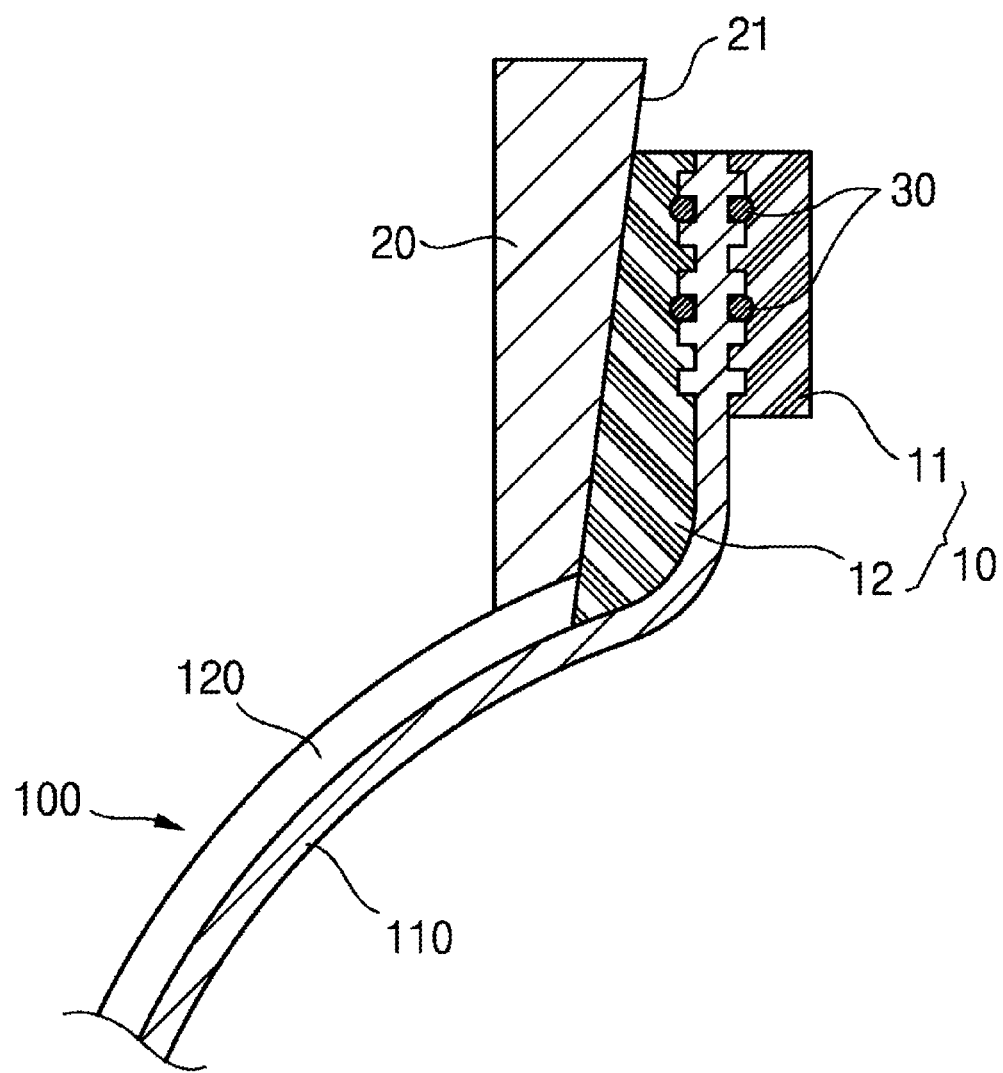

SEALING APPARATUS FOR HIGH-PRESSURE TANK AND HIGH-PRESSURE TANK COMPRISING SAME

TECHNICAL FIELD

The present invention relates to a sealing apparatus for a high-pressure tank and a high-pressure tank comprising the same, and more particularly, to a sealing apparatus for a high-pressure tank which is configured to allow a composite material high-pressure tank used in overall industrial fields to store a gaseous fuel in a stable state so as not to leak therefrom and a high-pressure tank comprising the same.

BACKGROUND ART

Generally, in natural-gas vehicles or hydrogen-fuel vehicles, a high-pressure tank configured to compress and store a gaseous fuel at high pressure is installed.

The high-pressure tank includes a liner formed of plastic so as to be lightened, a thermosetting fiber composite material surrounding an outer surface of the liner, and a metallic connection boss.

A material for lightening of the liner includes a plastic material such as a polyolefin-based resin and a polyamide-based resin. A layer of the composite material is formed by being coupled to surround a surface of the liner with a carbon fiber or a glass fiber mixed with a polymer resin such as an epoxy resin. A connection boss in the form of a nozzle is manufactured using a metallic material to be firmly coupled to a regulator or valve (hereinafter, integrally referred to as the valve) manufactured using a metallic material.

The high-pressure tank includes an inlet through which a gaseous fuel such as hydrogen and the like is introduced and discharged, and the metallic connection boss is inserted into the inlet. The plastic liner and the metallic connection boss are formed from heterogeneous materials which cause a problem in a coupling property. When the fuel is continually filled, due to a repetitive fatigue load, a risk of leaking of the gas always exists.

Accordingly, each manufacturer use a uniquely designed connection boss designed between the plastic liner and the metallic connection boss to prevent a gas leakage therebetween. Since it is difficult to completely couple the liner to the connection boss due to material properties, it is impossible to completely prevent a leakage of the gas contained in the high-pressure tank.

As a method of preventing the leakage of the gas of the high-pressure tank, a physical coupling structure introducing a screw thread in the connection boss or utilizing tightening and insertion members has been disclosed and a chemical coupling structure utilizing thermal fusion, adhesives, and the like has been disclosed.

However, a conventional physical coupling structure for a liner and a connection boss not only has disadvantages of complicating a shape of the connection boss, increasing a weight and manufacturing cost thereof, and having complicated operations but also has a structure vulnerable to a repetitive fatigue load such as fuel filling.

RELATED ART DOCUMENT

[Patent Document]
Patent Document 1: Japanese Patent Publication No. 2017-525902 (Sep. 7, 2017), the Related Art Document has a structure in which a coupling structure between a liner and a connection boss is vulnerable to a fatigue load caused by fuel filling, which is different from the present invention.

DISCLOSURE

Technical Problem

The present invention is directed to providing a sealing apparatus for a high-pressure tank in which a connection-boss type sealing apparatus is installed at an inlet of the high-pressure tank so as to maintain adequate airtight performance against repetitive fatigue load such as filling of a gaseous fuel and a high-pressure tank including the same.

Technical Solution

One aspect of the present invention provides a sealing apparatus for a high-pressure tank. The sealing apparatus includes a liner configured to accommodate a high-pressure fluid, a connection boss which is a metallic connector provided at an inlet of the liner, which comprises a first connection boss part coupled to an inner surface of the inlet and a second connection boss part coupled to an outer surface of the inlet and having a tapered shape with a relatively narrow upper side and a relatively wide lower side, and a coupling member configured to come into surface contact with an outer surface of the second connection boss part and having a tilted surface corresponding to a shape of the second connection boss part so that an inner diameter of a lower side is larger than that of an upper side.

The first connection boss part and the second connection boss part may be screw-coupled to the inner and outer surfaces of the inlet.

The lower side of the second connection boss part may be formed to come into at least partial contact with a neck portion of the inlet of the liner.

The first connection boss part and the second connection boss part may each include at least one O-ring which comes into contact with the inner and outer surfaces of the inlet.

Another aspect of the present invention provides a high-pressure tank including the sealing apparatus for a high-pressure tank.

The high-pressure tank may further include a reinforced layer surrounding an outer perimeter of the high-pressure tank, wherein the reinforced layer may be coupled to surround an outer surface of the liner and a surface of the lower side of the second connection boss part.

Advantageous Effects

According to the sealing apparatus for a high-pressure tank and the high-pressure tank including the same of the present invention, a connection-boss type sealing apparatus is installed at an inlet of the high-pressure tank and a sealing force caused by a expanding pressure of a high-pressure gas inside a connection boss is increased so as to provide an effect of maintaining adequate airtight performance against repetitive fatigue load such as filling of a gaseous fuel.

Also, since the connection-boss type sealing apparatus has a simple structure, the connection boss may be designed to be compact. In addition, not only may the number of components of the connection boss and manufacturing costs thereof be reduced but also productivity may be improved by reducing the number of operations.

DESCRIPTION OF DRAWINGS

FIG. 1 is an exploded perspective view of a high-pressure tank according to the present invention.

FIG. 2 is a configuration view illustrating a case in which a high-pressure tank, on which a sealing apparatus according to the present invention is mounted, expands due to a tank pressure so that the sealing apparatus operates.

FIG. 3 is an enlarged view illustrating part A of FIG. 2.

MODES OF THE INVENTION

Since the present invention may be variously modified and have a variety of forms, particular embodiments will be described in detail in the text. However, these are not intended to limit the present invention to a particularly disclosed form and it should be understood that the present invention includes all changes, equivalents, and substitutes included within the concept and technical scope of the present invention. In a description on each drawing, like elements will be referred to as like reference numerals.

The terms are used only for distinguishing one component from another. The terms used herein are used merely for describing particular embodiments and are not intended to limit the present invention. Singular expressions, unless clearly defined otherwise in context, include plural expressions.

Hereinafter, an embodiment of the present invention will be described in detail below with reference to the attached drawings.

FIG. 1 is an exploded perspective view of a high-pressure tank according to the present invention, FIG. 2 is a configuration view illustrating a case in which a high-pressure tank, on which a sealing apparatus according to the present invention is mounted, expands due to a tank pressure so that the sealing apparatus operates, and FIG. 3 is an enlarged view illustrating part A of FIG. 2;

As shown in the drawings, the present invention relates to a high-pressure tank 100 configured to store a gaseous fuel of a vehicle. The high-pressure tank 100 includes a liner 110 which is formed of a hollow cylinder and is configured to maintain airtightness of the gaseous fuel therein.

A high-pressure gaseous fuel is stored in a space inside the liner 110. The liner 110 is made of a plastic material such as a polyolefin-based resin and a polyamide-based resin and is manufactured through blow molding, rotational molding or the like.

Also, a reinforced layer 120 formed of a fiber-reinforced composite material having a structural strength and rigidity to endure high internal pressure of a gaseous fuel is formed on an outer surface of the liner 110 while surrounding the high-pressure tank 100.

The reinforced layer 120 is formed by carbon fiber mixed with a polymer resin such as an epoxy resin to maintain the rigidity and is coupled to surround surfaces of the liner 110 and a connection boss 10 which will be described below.

Since a low-density gas is compressed and stored in the high-pressure tank 100, a volume of the high-pressure tank 100 which stores a fuel increases so that at least one high-pressure tank 100 is applied to a vehicle.

Also, the high-pressure tank 100 includes a cylindrical inlet 11a on at least one of top and bottom sides and includes screw threads for fastening which are formed on an inner surface and an outer surface of the inlet 11a.

The connection boss 10 that is a metallic connector configured to suction and discharge a gaseous fuel is coupled to the inlet 11a of the high-pressure tank 100, and a valve or the like is couplably included in the connection boss 10.

The valve may be coupled to the connection boss 10 through a screw-fastening method or a coupling method such as mechanical assembling and the like.

The connection boss 10 is manufactured using a metallic material that is different from the material of the plastic liner 110. The connection boss 10 may be manufactured using a metallic material which is homogeneous material as that of the valve or the like for firm coupling with the valve or the like.

The connection boss 10 includes a first connection boss part 11 coupled to the inner surface of the inlet 11a and a second connection boss part 12 coupled to an outside of the inlet 11a.

The first connection boss part 11 has a hollow cylinder shape and includes an outer screw thread formed on an outer surface and fastened to the screw thread inside the inlet 11a and is sealable by coupling the valve or the like through the hollow.

The second connection boss part 12, like the first connection boss part 11, has a hollow-cylinder shape and includes an internal screw thread formed on an inner surface and fastened to the screw thread outside the inlet 11a.

The second connection boss part 12 has a tapered shape having a relatively narrow upper side and a relatively wide lower side. That is, the shape gradually becomes narrower toward the upper side. The lower side of the second connection boss part 12 on which a screw thread is not formed is formed to come into at least partial contact with a neck portion of the inlet 11a of the liner 110. That is, in the embodiment of the present invention, since a partial section of a lower side of the neck portion of the inlet 11a is formed to be gently curved, the lower side of the second connection boss part 12 may be formed to be gently curved to coincide therewith.

When an inner lower side of the second connection boss part 12 is formed to coincide with a shape of the lower side of the neck portion of the inlet 11a as described above, a coupling property between the inlet 11a and the second connection boss part 12 may be further improved.

Here, the reinforced layer 120 is coupled to surround the outer surface of the liner 110 and a surface of the lower side of the second connection boss part 12 so as to maintain structural strength and rigidity.

In the first connection boss part 11 and the second connection boss part 12, at least one O-ring 30 is installed to come into contact with an interior and exterior of the inlet 11a and to maintain airtightness so as to prevent a leakage of a gaseous fuel through inner or outer surface of the inlet 11a.

In the first connection boss part 11 and the second connection boss part 12, in order to install the O-ring 30, a groove having a semicircular cross section may be formed in a side surface pressed against the inlet 11a.

The O-ring 30 is formed of a rubber material and may prevent high-pressure gaseous fuel from leaking through a gap between the inlet 11a and the first and second connection boss parts 11 and 12. When durability thereof decreases due to use, the O-ring 30 is separated from the groove and is then replaced with a new O-ring 30.

As shown in FIGS. 2 and 3, the high-pressure tank 100 in which the inlet 11a is sealed using the connection boss 10 while a fuel is injected and stored at a high pressure is coupled and fixed to an additional coupling member 20 fixed to a chassis of the vehicle.

When the high-pressure tank 100 on which the connection boss 10 including the first connection boss part 11 and the second connection boss part 12 is mounted is airtightly coupled to the coupling member 20 of the chassis of the vehicle, not only may the high-pressure tank 100 not be ruptured but also pressure-resistant performance may be continuously maintained even when an impact is applied thereto.

The coupling member 20 is configured to be couplable while maintaining airtightness with the second connection boss part 12 coupled to the inlet 11a of the high-pressure tank 100. That is, an outer surface of the second connection boss part 12 which is tapered may be pressed against and come into surface contact with an internal coupling surface of the coupling member 20, The coupling member 20 includes a coupling space part 21 having a tilted surface with an inner diameter increasing from a lower side to an upper side to correspond to a shape of the second connection part 12 which is insertable therein.

Since an inner tilted surface of the coupling space part 21 formed in the coupling member 20 and an outer tilted surface of the second connection boss part 12 are formed to coincide with each other, when the coupling member 20 and the second connection boss part 12 are coupled to each other while coming into contact with and being coupled to each other along the tilted surface without mechanical combination, the coupling member 20 and the second connection boss part 12 are pressed against each other so as to implement airtightness.

Here, the upper sides of the tilted surfaces of the second connection boss part 12 and the coupling member 20 indicate a direction toward the inlet 11a on the basis of a parallel central part of the high-pressure tank 100 and the lower sides thereof indicate a direction toward a bottom surface on the basis of the parallel central part of the high-pressure tank 100. Even when the high-pressure tank 100 is reversed to be upside down, the second connection boss part 12 and the coupling member 20 follow the criteria.

Meanwhile, when a gaseous fuel is filled through the inlet 11a, the high-pressure tank 100 expands longitudinally and laterally due to internal pressure of the high-pressure tank 100. Here, since the inlet 11a of the high-pressure tank 100 expands laterally at the same time, the second connection boss part 12 screw-fastened to the outer surface of the inlet 11a also expands and extends.

When the second connection boss part 12 externally expands and extends, an expanding pressure caused by the gaseous fuel is applied to the coupling member 20 coupled to the second connection boss part 12 so that a coupling force between the second connection boss part 12 and the coupling member 20 further increases. Accordingly, there is an effect of completely blocking the gaseous fuel at high pressure from leaking to the outside.

Meanwhile, since inner/outer tilted surfaces where the second connection boss part 12 and the coupling member 20 meet and come into contact with each other have adequately small surface roughness so as to be easily slidable, when the high-pressure tank 100 receives a swelling pressure of the connection boss 10 due to the internal pressure, the coupling force and a sealing force of the first and second connection boss parts 11 and 12 may be increased.

According to the present invention, a connection-boss type sealing apparatus is installed at the inlet 11a of the high-pressure tank 100 so that adequate airtight performance may be maintained due to an increase in a sealing force caused by a swelling pressure against a repeated fatigue load such as charging of a gaseous fuel. Also, the connection-boss type sealing apparatus has a simple structure so that the connection boss 10 may be designed to be compact. In addition, the number of components of the connection boss 10 and manufacturing costs thereof may be reduced and productivity may be improved by reducing the number of operations.

Although the exemplary embodiment of the present invention has been described above, the present invention is not limited to the description of the embodiment and it should be construed that a variety of modifications made by one of ordinary skill in the art without departing from the scope of the claims of the present invention fall within the scope of the present invention.

DESCRIPTION OF REFERENCE NUMERALS

| [Description of Reference Numerals] | |
| --- | --- |
| 10: connection boss | 11: first connection boss part |
| 12: second connection boss part | 20: coupling member |
| 30: O-ring | 100: high-pressure tank |
| 110: liner | 120: reinforced layer |

The invention claimed is:

1. A sealing apparatus for a high-pressure tank for storing a gaseous fuel of a vehicle, comprising:
   a liner configured to accommodate a high-pressure fluid;
   a connection boss provided at an inlet of the liner and made of metal, comprising a first connection boss part coupled to an inner surface of the inlet and a second connection boss part coupled to an outer surface of the inlet and having a tapered shape with a relative narrow upper side and a relatively wide lower side, the second connection boss part having an outer tilted surface; and
   a coupling member, configured to come into surface contact with the outer tilted surface of the second connection boss part and having an inner tilted surface corresponding to a shape of the outer tilted surface of the second connection boss part so that a diameter of a lower side of the tilted inner surface is larger than a diameter of an upper side of the tilted inner surface,
   wherein the inner tilted surface of the coupling member comes into surface contact with and is coupled to the outer tilted surface of the second connection boss part without a mechanical combination,
   wherein the upper side indicates a direction toward the inlet and the lower side indicates a direction toward a bottom surface with respect to a central part of the high-pressure tank.

2. The sealing apparatus of claim 1, wherein the first connection boss part and the second connection boss part are screw-coupled to the inner and outer surfaces of the inlet.

3. The sealing apparatus of claim 1, wherein the lower side of the second connection boss part is formed to come into at least partial contact with a neck portion of the inlet of the liner.

4. The sealing apparatus of claim 1, wherein the first connection boss part and the second connection boss part each comprise at least one O-ring which comes into contact with the inner and outer surfaces of the inlet.

5. A high-pressure tank for storing a gaseous fuel of a vehicle, comprising:
   a liner formed of a hollow cylinder and configured to accommodate a high-pressure fluid;
   a connection boss provided at an inlet of the liner and made of metal, comprising a first connection boss part coupled to an inner surface of the inlet and a second connection boss part coupled to an outer surface of the inlet and having a tapered shape with a relative narrow upper side and a relatively wide lower side, the second connection boss part having an outer tilted surface; and a coupling member, configured to come into surface contact with an outer tilted surface of the second connection boss part and having an inner tilted surface corresponding to a shape of the outer tilted surface of the second connection boss part so that a diameter of a lower side of the tilted inner surface is larger than a diameter of an upper side of the tilted inner surface, wherein the inner tilted surface of the coupling member comes into surface contact with and is coupled to the outer tilted surface of the second connection boss part without a mechanical combination, wherein the upper side indicates a direction toward the inlet and the lower side indicates a direction toward a bottom surface with respect to a central part of the high-pressure tank.

6. The high-pressure tank of claim 5, further comprising a reinforced layer configured to surround an outer perimeter of the high-pressure tank, wherein the reinforced layer is coupled to surround an outer surface of the liner and a surface of the lower side of the second connection boss part.

* * * * *